United States Patent [19]

Gotoh

[11] Patent Number: 4,821,131
[45] Date of Patent: Apr. 11, 1989

[54] CORE ASSEMBLY FOR A FLYING MAGNETIC HEAD WITH MAGNETIC GAP ON AIR-BEARING SURFACE

[75] Inventor: Ryo Gotoh, Moka, Japan

[73] Assignee: Hitachi Metals, Ltd., Japan

[21] Appl. No.: 217,059

[22] Filed: Jul. 8, 1988

Related U.S. Application Data

[63] Continuation of Ser. No. 906,039, Sep. 10, 1986, abandoned.

[30] Foreign Application Priority Data

| Sep. 13, 1985 | [JP] | Japan | 60-201630 |
| Oct. 11, 1985 | [JP] | Japan | 60-224665 |
| Oct. 11, 1985 | [JP] | Japan | 60-224666 |
| Oct. 14, 1985 | [JP] | Japan | 60-226910 |
| Apr. 21, 1986 | [JP] | Japan | 61-90000 |

[51] Int. Cl.[4] .................... G11B 5/60; G11B 5/187; G11B 5/127
[52] U.S. Cl. .................... 360/103; 360/122; 360/125
[58] Field of Search .............. 360/102, 103, 129, 122, 360/120, 123, 119, 125

[56] References Cited

U.S. PATENT DOCUMENTS

| 3,823,416 | 7/1974 | Warner | 360/132 |
| 4,130,847 | 12/1978 | Head et al. | 360/122 |
| 4,425,701 | 1/1984 | Takahashi et al. | 360/121 X |
| 4,555,739 | 11/1985 | Le Van et al. | 360/103 |
| 4,559,572 | 12/1985 | Kumasaka et al. | 360/125 X |
| 4,636,900 | 1/1987 | Tung et al. | 360/124 |
| 4,656,547 | 4/1987 | Kumasaka et al. | 360/122 X |
| 4,658,314 | 4/1987 | Sasazaki | 360/103 |

FOREIGN PATENT DOCUMENTS

| 0026815 | 2/1977 | Japan | 360/103 |
| 0179925 | 10/1983 | Japan | 368/126 |
| 0202510 | 10/1985 | Japan | 360/122 |

Primary Examiner—A. J. Heinz
Assistant Examiner—Andrew L. Sniezek
Attorney, Agent, or Firm—Finnegan, Henderson, Farabow, Garrett & Dunner

[57] ABSTRACT

A flying magnetic head composed of a first core and a second core bonded to each other with glass, having a pair of slide rails extending longitudinally on both lateral sides of the head; a gap defined on at least one of the slide rails by the first core and the second core and extending laterally; and a pair of recesses filled with glass and located on both lateral sides of the gap, thereby determining a track width of the gap. Because the magnetic gap is in coplanar with the surface of one of the slide rails, the flying magnetic head has excellent CSS characteristics. Also, it can be produced by assembling core blocks and cutting them into each piece and machining without restoring to complicated steps.

14 Claims, 6 Drawing Sheets

CORE ASSEMBLY FOR A FLYING MAGNETIC HEAD WITH MAGNETIC GAP ON AIR-BEARING SURFACE

This application is a continuation of application Ser. No. 906,039, filed Sept. 10, 1986, now abandoned.

BACKGROUND OF THE INVENTION

1. Field of the Invention

The present invention relates to a flying magnetic head for use in magnetic disk drives, etc, and more particularly to a flying magnetic head that flies over a magnetic recording medium because of an air flow due to a relative movement of the magnetic head and the magnetic recording medium.

2. Description of the Prior Art

Magnetic recording systems utilizing magnetic heads that fly on an air film over a magnetic recording disk surface are well known in the art. Decreasing the space between a magnetic head gap and the magnetic recording medium leads to enhancing system performance. At the same time, the closer a magnetic head is to a magnetic recording medium, the more chances there are for the magnetic head to come into contact with the magnetic recording medium.

Typically, a magnetic head is in contact with a magnetic disk while the latter is not rotating, and as the disk starts rotating, the magnetic head begins to fly by an air flow therebetween. The magnetic head is flying over the magnetic disk by a certain distance while the disk is rotating, but the head is again brought into contact with the magnetic disk when the disk comes to stop. This process is called a contact-start-stop (CSS) cycle. To withstand the impact caused by contact with the magnetic disk during the CSS cycles, the magnetic head is required to have high resistance to such the impact. Such characteristics of the magnetic head may be called CSS characteristics.

Attempts have been made to provide magnetic heads which can fly above a magnetic disk as close as possible and at the same time has good CSS characteristics.

A typical, conventional flying magnetic head is a Winchester-type magnetic head as disclosed by U.S. Pat. No. 3,823,416, which is shown in FIG. 5. The Winchester-type magnetic head comprises a magnetic slider body 51 and a magnetic core 52, the slider body 51 having a pair of longitudinal side rails 53, 54 and a central rail 55. Each rail has a taper-flat profile with the respective flat portions 56, 57 and 58. The three rails are separated by bleed slots 59, 60 which provide paths for undesired air to bleed off from the air bearing outside rail surfaces during flying operations without contributing to the effective air bearing surface of the slider or changing the flying height. The magnetic core 52 is bonded to the trailing face of the slider body 51 with glass 61, and a wire is wound therearound (not shown in FIG. 5). A magnetic gap 62 is defined by the central rail 55 and the magnetic core 52.

However, since the magnetic gap 62 is provided between the thin, central rail 55 and the magnetic core 52, this Winchester-type magnetic head does not have good CSS characteristics.

A composite-type magnetic head as shown in FIG. 6 is disclosed, for instance, by Japanese Utility Model Laid-Open No. 57-189173. This magnetic head comprises a slider body 61 having a pair of longitudinal side rails 62, 63 having upwardly inclined end portions 64, 65. Embedded in one of the side rails is a magnetic core 66 consisting of two core pieces with a magnetic gap 67. The magnetic core 66 is fixed by glass 68 in a slot 69 of the side rail 62.

Because the magnetic gap 67 is in coplanar relationship with the surface of the side rail 62, the composite-type magnetic head has relatively improved CSS characteristics. This magnetic head, however, is not easy to manufacture, requiring many complicated steps with high precision. The reason therefor is primarily that the bonded magnetic core 66 must be inserted and fixed in the slot 69 of the side rail 62 for each head. The fact that the magnetic core 66 is very small requires that assembling operation be carried out under a microscope by hand.

OBJECT AND SUMMARY OF THE INVENTION

An object of the present invention is, therefore, to provide a flying magnetic head having good CSS characteristics.

Another object of the present invention is to provide a flying magnetic head of the structure which can be easily manufactured.

In view of the above objects, the inventor has done internal research on the structure of a flying magnetic head. As a result, it has been found that good CSS characteristics can be achieved without requiring complicated manufacturing steps by forming a magnetic gap on one of slide rails of a magnetic head directly by two core bodies.

That is, the flying magnetic head according to the present invention is composed of a first core and a second core bonded to each other with glass, having a pair of slide rails extending longitudinally on both lateral sides of the head, a gap defined on at least one of the slide rails by the first core and the second core and extending laterally; and a pair of recesses filled with glass and located on both lateral sides of the gap, thereby determining a track width of the gap.

DESCRIPTION OF THE PREFERRED EMBODIMENTS

Figure 1:
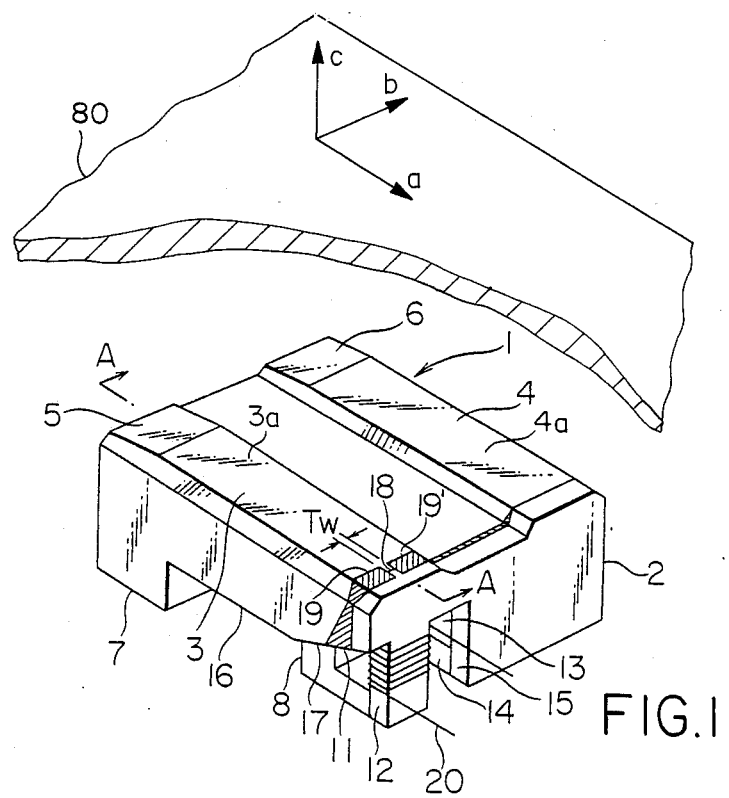
FIG. 1 is a perspective view of a flying magnetic head according to one embodiment of the present invention.

Referring to FIG. 1, a flying magnetic head according to the present invention is composed of a first core 1 and a second core 2. The magnetic head is shown juxtaposed with rotating magnetic disk 80 which rotates to create relative motion in the direction "a" between disk 80 and the magnetic head. Direction "a" hereinafter will be referred to as the "longitudinal" direction, "b" as the "traverse" direction, and "c" as the "vertical" direction. The first core 1 constitutes a slider body having a pair of longitudinal slide rails 3, 4 having upwardly inclined end portions 5, 6 and contact surface 3a, 4a, respectively. Incidentally, please note that since the magnetic head is shown upside-down in the figures attached hereto for convenience, the term "upward" used herein means "downward" in the figures. The second core 2 has a bottom surface having the same profile as that of the first core 1, so that the slide rails 3, 4 extend smoothly.

Figure 2:
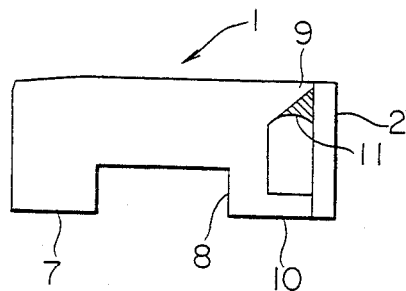
FIG. 2 is a cross sectional view taken along the line A—A in FIG. 1.

FIG. 2 shows the cross sections of the first and second cores 1, 2 bonded to each other. The first core 1 has an upward projection 7 at the leading end thereof, an L-shaped projection 8 near the trailing end thereof, and a triangular cross-sectioned projection 9 at the trailing end thereof. The L-shaped projection 8 has a horizontal projection 10. On the other hand, the second core 2 is a flat plate having the corresponding profile to that of the first core 1. The second core 2 is bonded to the tip ends of the triangular projection 9 and of the horizontal projection 10 with glass 11 denotes a glass layer for reinforcing the glass bonding of the first and second cores.

As seen in FIG. 1, the L-shaped projection 8 and the corresponding projection 12 of the second core 2 have such reduced widths that their outer side surfaces are laterally receding from the side surface of the projection 7, and that there is a relatively wide gap 13 for enabling wire winding between their inner side surfaces and an intermediate side surface 14 of the first core 1 and an intermediate side surface 15 of the second core 2. Also, an upper surface 16 of the first core 1 has a downwardly inclined portion 17 at the trailing end thereof. The downwardly inclined portion 17 extends lineally to the second core 2 via the glass layer 11. As mentioned below, the downwardly inclined portion 17 and the gap 13 can be formed by grinding after assembling.

As is apparent from FIG. 1, a magnetic gap 18 having a track width Tw is defined near the trailing end of the magnetic head by the first and second cores 1, 2. Provided on both lateral sides of the magnetic gap 18 are a pair of recesses 19, 19' filled with glass. In this embodiment, each recess is defined by notches of the first and second cores 1, 2. It should be noted, however, that the recesses may be defined by notches formed in only one of the first and second cores 1, 2.

The track width Tw of the magnetic gap 18 can be adjusted by changing a lateral length of each glass-filled recess 19, 19'. Whatever the lengths of the glass-filled recesses 19, 19', the magnetic gap 18 is in coplanar relationship with the contact surface 3a of the slide rail 3. Therefore, it is highly resistant to the impact caused by contact with a magnetic disk surface during operations, such as disk 80 in FIG. 1, particularly at the time of starting and stopping. In other words, the magnetic gap 18 of this structure has excellent CSS characteristics.

In this embodiment, a wire 20 is wound around the vertical projection 12 of the second core 2. However, it may be wound around the horizontal projection 10 of the first core 1, if desired.

In a preferred embodiment, both of the first and second cores 1, 2 are made of magnetic materials such as ferrite. Magnetic, thin metal layers may be formed, for instance, by sputtering on the gap-forming surfaces of the first and second cores 1, 2. In this case, the magnetic, thin metal layers should have a higher saturation magnetic flux density than the magnetic cores. The magnetic head with the magnetic, thin metal layers is operable with higher-coercivity recording medium, so that it has good electro-magnetic conversion efficiency.

In another preferred embodiment, the first and second cores 1, 2 may be non-magnetic, if magnetic, thin metal layers are formed on the gap-forming surfaces of the first and second cores 1, 2. This gap structure is constituted by the magnetic, thin metal layers only, so that it suffers from substantially no pseudo-gap effect, enhancing its frequency characteristics.

Figure 3:
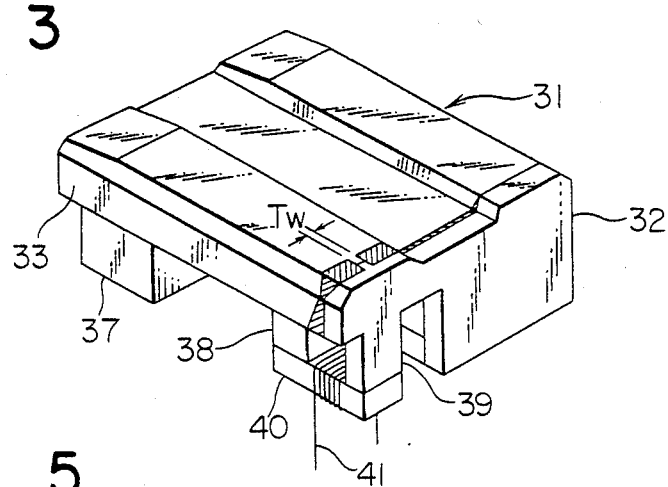
FIG. 3 is a perspective view of a flying magnetic head according to another embodiment of the present invention.
Figure 5:
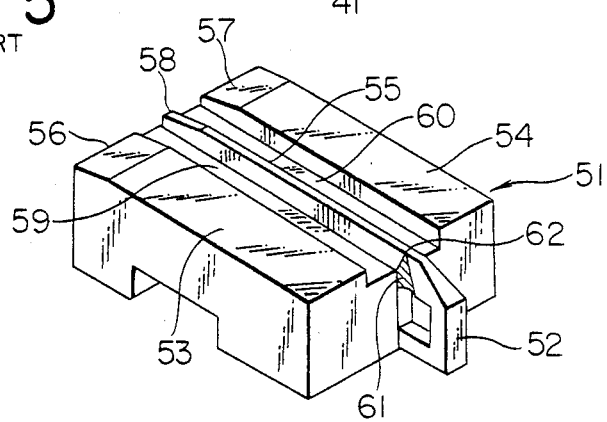
FIG. 5 is a perspective view of a Winchester-type magnetic head.
Figure 6:
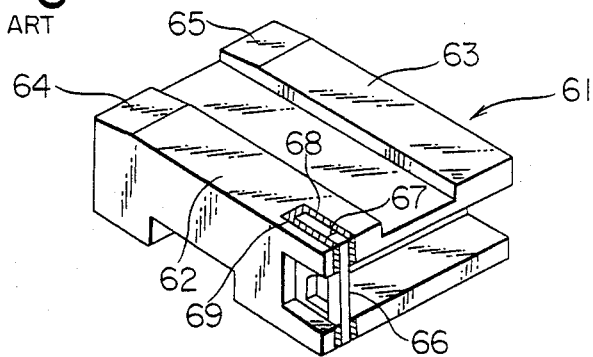
FIG. 6 is a perspective view of a composite-type magnetic head.

FIG. 3 shows a flying magnetic head according to another embodiment of the present invention, it is essentially the same as shown in FIG. 1 except for upper projections of first and second cores 31, 32. Accordingly, explanation will be omitted for the same portions. An upper projection 37 is laterally receding by a certain distance from a side surface 33 of the head. Likewise, an upper projection 38 of the first core 31 and an upper projection of the second core 32 are laterally receding from the side surface 33 by the same distance. Because of this structure, the downward inclination 17 as shown in FIG. 1 is not necessary for the magnetic head of FIG. 2. A separate core piece 40 having the same width as those of the projections 38, 39 is bonded to these projections 38, 39. In this structure, a wire 41 is wound around the separate core piece 40 in advance, and the core piece 40 is bonded to the projections 38, 39 for facilitating wire winding. Of course, a wire can be wound around the projection 39 with or without a bobbin before bonding the separate core piece 40.

The production of the flying magnetic head of the present invention will be explained in detail referring to FIGS. 4A-4F.

Figure 4A:
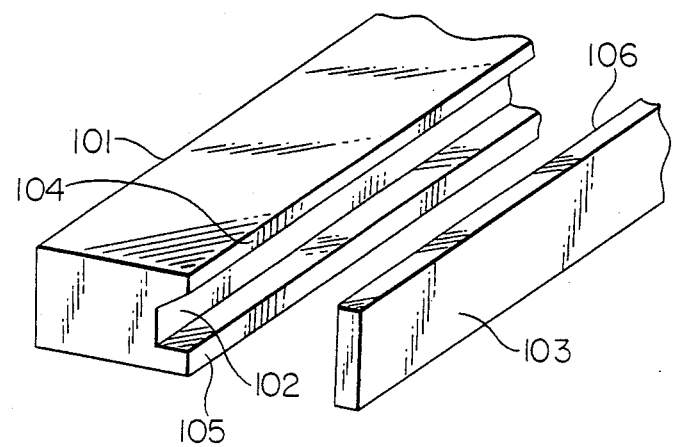
FIGS. 4A–4F are perspective views showing the steps of manufacturing the flying magnetic head of the present invention.

In FIG. 4A, a first core block 101 having a lateral groove 102 and a second core block 103 are prepared. As seen from FIG. 4A, the second core block 103 is a thin plate with the same width as that of the first core block 101. The opposing surface 104, 105, 106 of the first and second core blocks 101, 103 which are to be bonded together are mirror-finished.

Figure 4B:
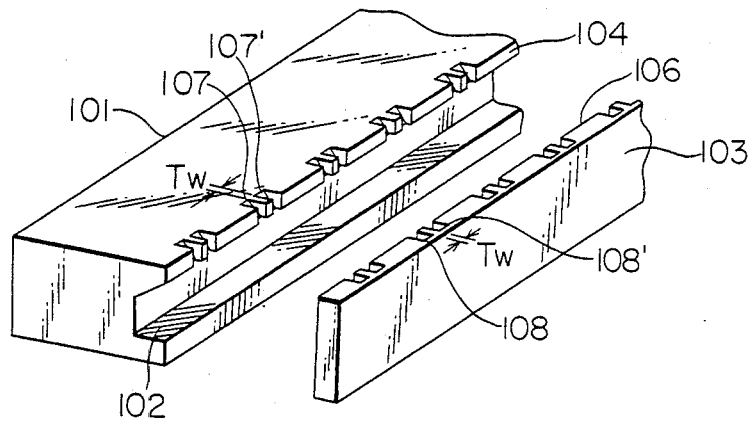
Figure 4C:
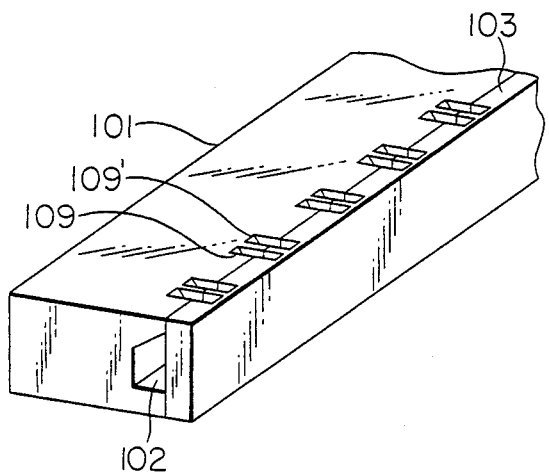

In FIG. 4B, a pair of slanted notches 107, 107' are formed at the edge of the opposing surface 104 with a distance egual to the track width Tw. Corresponding slanted notches 108, 108' are also formed at the edge of the opposing surface 106 with the same track width Tw. A plurality of such pairs are formed on the intervals equal to the lateral width of a magnetic head to be produced not only at the edge of the first core block 101 but also at the corresponding edge of the second core block 103. As a result, when the first and second core blocks 101, 103 are put together, the corresponding notches 107, 108 and 107', 108' define a pair of recesses 109, 109' as shown in FIG. 4C.

Figure 4D:
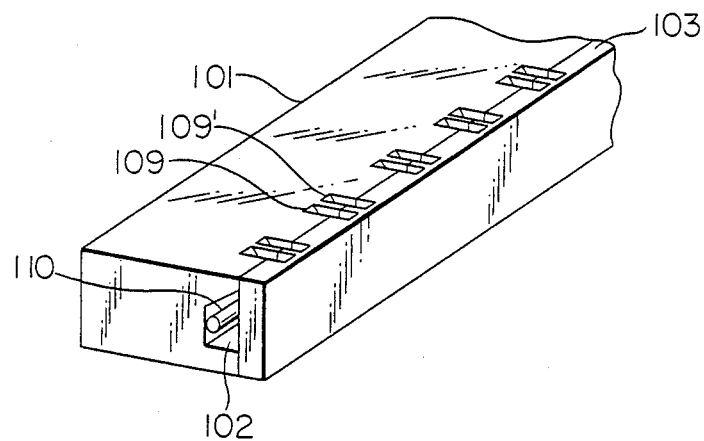

A glass rod 110 is placed in the lateral groove 102 as shown in FIG. 4D. Because the recesses 109, 109' are partially in communication with the lateral groove 102, they can be filled with glass when the glass rod 110 is melted. A glass layer 111 is also formed adjacent to the recesses 109, 109' for the purpose of reinforcing the glass bonding as shown in FIG. 4E. In this connection, please note that the figures are shown upside-down for clear understanding of the manufacturing steps.

Glass used for bonding the first and second cores has preferably a thermal expansion coefficient as close to that of the core materials as possible. A typical example of the preferred glass is lead-silica glass having a thermal expansion coefficient of $70 \times 10^{-7} - 130 \times 10^{-7}$ deg$^{-1}$.

The glass bonding is carried out at temperatures of 500°-900° C. for 15-60 minutes. For ensuring the glass bonding, a thin glass layer may be formed in advance on the gap-forming surfaces of the first and second core blocks 101, 103.

Figure 4G:
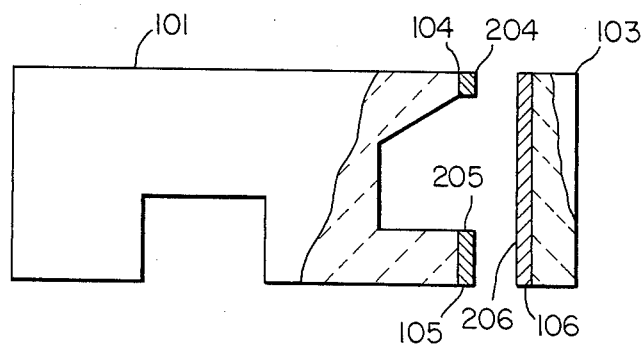
Figure 4H:
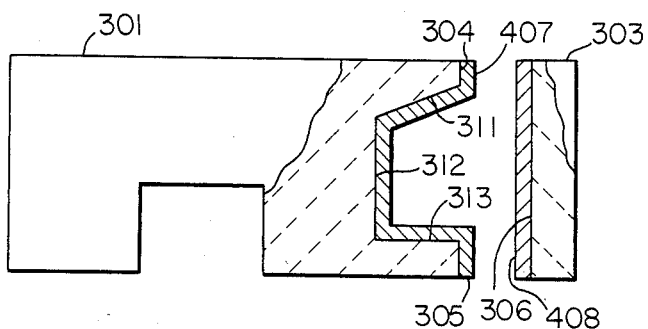
Figure 4E:
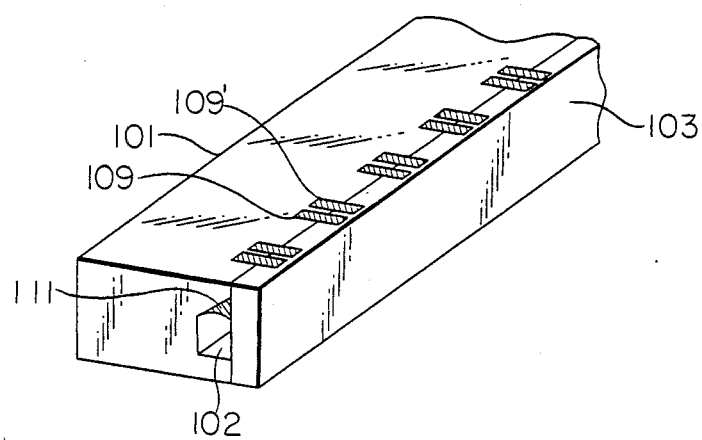
Figure 4F:
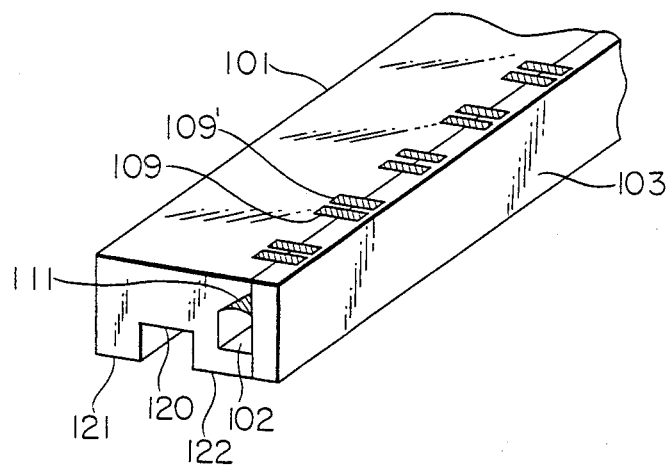

After completion of the glass bonding, a lateral groove 120 is formed on a top surface of the first core block 101 so that an upward projection 121 and an L-shaped projection 122 are formed as shown in FIG. 4F. The top and bottom surfaces are ground properly. The bonded block assembly is then cut into each magnetic head body. To provide the magnetic head of FIG. 1, the L-shaped projection 122 and the second core 103 are slantingly machined to provide the downwardly inclined portion 17 and the gap 13. Because of the inclination of the portion 17 and of the bottom surface of the gap 13, machining can be carried out without being interfered by the upper projection 7. The wire winding is finally conducted to finish the magnetic head.

Incidentally, magnetic, thin metal layers 204, 205 and 206 may be formed in advance on the gap-forming surfaces 104, 105 and 106, respectively of the first and second core blocks 101, 103, if necessary, as is depicted in FIG. 4G, for the case of core blocks made from magnetic materials. Even in such a case, the subsequent procedures are essentially the same.

The first and second cores may be made of magnetic materials such as Mn-Zn ferrite or non-magnetic materials such as MnO-NiO, $TiBaO_3$ and $TiCaO_3$. Magnetic, thin metal layers which may be formed on the gap-forming surfaces are made of, for instance, Co-base alloys and Fe-Al-Si alloys (Sendust). As shown in FIG. 4H, magnetic thin metal layers 407, 408 are formed on all the opposing surfaces of non-magnetic core blocks 301, 303 in order to provide a complete magnetic circuit, as one skilled in the art would understand. Thus, metal layer 407 is formed on contiguous surfaces 304, 311, 312, 313 and 305 of core 301, while layer 408 is formed on surface 306 of core 303. Glass used for bonding may be, for instance, $PbO-ZnO-B_2O_3-SiO_2$ glass.

As mentioned above, since the magnetic gap whose track width is determined by a pair of adjacent, glass-filled recesses is in coplanar with the contact surface of one of the slide rails extending longitudinally on both lateral sides of the flying magnetic head according to the present invention, it is highly resistant to any impact caused by contact with a magnetic recording disk. This means that the magnetic head of the present invention enjoys at least as high CSS characteristics as those of the composite-type magnetic head. In addition, as illustrated by FIGS. 4A-4F, the magnetic head of the present invention can be manufactured without complicated steps. Thus, it is suitable for less costly mass production.

The magnetic head with one magnetic gap has been explained referring to the attached figures, but it should be noted that two magnetic gaps may be provided on both slide rails of the head. Further, any other modifications can be embraced unless they deviate from the scope of the present invention.

What is claimed is:

1. A core assembly for a flying magnetic head for use with magnetic recording medium such as a magnetic disk, the medium being movable relative to the head and the direction of relative motion defining a longitudinal direction, the assembly comprising a first core and a second core having respective opposed longitudinal end surfaces, at least one of said end surfaces having a lateral groove formed therein and oriented to be parallel to the magnetic medium during use of the head, for partially defining a wire winding window, said opposed end surfaces being bonded to each other with glass,
   a pair of slide rails formed in part by each of said bonded first and second cores and extending longitudinally on both lateral sides of the core assembly, at least one of said rails having a planar surface for opposing the magnetic recording medium, each of said first and second core members extending substantially the full lateral width of the core assembly;
   a gap defined on said slide rail planar surface by said opposed end surfaces of said first core and said second core and extending laterally; and
   a pair of recesses filled with glass and located on both lateral sides of said gap and determining a track width of said gap.

2. The core assembly for a flying magnetic head according to claim 1, wherein each of said first core and said second core has a pair of notches formed in said respective opposed longitudinal end surfaces, and said recesses are defined by the corresponding notches of said first and second cores.

3. The core assembly for a flying magnetic head according to claim 1, wherein a window for wire winding is defined adjacent said gap by said lateral groove being formed in the opposing end surface of said first core and a vertical extension of said second core.

4. The core assembly for a flying magnetic head according to claim 3, wherein a wire is wound around the vertical extension of said second core.

5. The core assembly for a flying magnetic head according to claim 1, wherein a window for wire winding is defined adjacent said gap by said lateral groove being formed in the opposing end surface of said first core, a vertical extension of said first core, a vertical extension of said second core, and a longitudinal core piece bonded to the vertical extensions of said first and second cores.

6. The core assembly for a flying magnetic head according to claim 5, wherein a wire is wound around said bonded longitudinal core piece.

7. The core assembly for a flying magnetic head according to claim 5, wherein a wire is wound around the vertical extension of said second core.

8. The core assembly for a flying magnetic head according to any one of claims 1-7, wherein said first and second cores are made of a magnetic material.

9. The core assembly for a flying magnetic head according to claim 8, wherein said magnetic material is Mn-Zn ferrite.

10. The core assembly for a flying magnetic head according to claim 8, further comprising a magnetic, thin metal layer formed on each of the opposing end surfaces of said gap, said magnetic, thin metal layer having a higher saturation magnetic flux density than the first and second magnetic cores.

11. The core assembly for a flying magnetic head according to claim 10, wherein said magnetic, thin metal layer is an amorphous Co-base alloy.

12. The core assembly for a flying magnetic head according to any one of claims 1-7, wherein said first and second cores are made of a non-magnetic material, and said assembly further comprises a magnetic, thin metal layer formed on each of the opposing end surfaces defining said gap.

13. The core assembly for a flying magnetic head according to claim 12, wherein said non-magnetic material is an MnO-Nio, $TiBaO_3$ or $TiCaO_3$ ceramic.

14. The core assembly for a flying magnetic head according to claim 13, wherein said magnetic, thin metal layer is made of a material selected from the group consisting of amorphous Co-base alloys and Fe-Al-Si alloys.

* * * * *